(12) United States Patent
Yamahara et al.

(10) Patent No.: US 8,496,848 B2
(45) Date of Patent: *Jul. 30, 2013

(54) FILMS AND PROCESSES FOR PRODUCING THE SAME

(75) Inventors: Motohiro Yamahara, Nara (JP); Takashi Kato, Tokyo (JP)

(73) Assignees: Sumitomo Chemical Company, Limited, Tokyo (JP); The University of Tokyo, Tokyo (JP)

( * ) Notice: Subject to any disclaimer, the term of this patent is extended or adjusted under 35 U.S.C. 154(b) by 194 days.

This patent is subject to a terminal disclaimer.

(21) Appl. No.: 11/918,665

(22) PCT Filed: Apr. 24, 2006

(86) PCT No.: PCT/JP2006/308534
§ 371 (c)(1),
(2), (4) Date: Oct. 17, 2007

(87) PCT Pub. No.: WO2006/118073
PCT Pub. Date: Nov. 9, 2006

(65) Prior Publication Data
US 2009/0072194 A1 Mar. 19, 2009

(30) Foreign Application Priority Data
Apr. 28, 2005 (JP) .................................. 2005-131386

(51) Int. Cl.
*C09K 19/00* (2006.01)
*C09K 19/06* (2006.01)
*C09K 19/34* (2006.01)
*C09K 19/52* (2006.01)
*G02F 1/1333* (2006.01)

(52) U.S. Cl.
USPC ................. 252/299.01; 252/299.6; 428/1.1; 428/1.2; 428/1.3; 349/1; 349/56; 349/182

(58) Field of Classification Search
USPC ............... 252/299.01, 299.6; 428/1.1, 1.2, 428/1.3; 349/1, 56, 182; 430/20
See application file for complete search history.

(56) References Cited

U.S. PATENT DOCUMENTS

| | | | |
|---|---|---|---|
| 4,915,867 A | 4/1990 | Morita et al. | |
| 6,139,772 A | 10/2000 | Ukon | |
| 2006/0104188 A1* | 5/2006 | Yamashita et al. | 369/275.1 |
| 2009/0072194 A1* | 3/2009 | Yamahara et al. | 252/299.01 |
| 2009/0104378 A1* | 4/2009 | Yamahara et al. | 428/1.31 |

FOREIGN PATENT DOCUMENTS

| | | |
|---|---|---|
| JP | 10-161132 A | 6/1998 |
| JP | 11-60619 A | 3/1999 |
| JP | 2000-273319 A | 10/2000 |
| JP | 2001-139950 A | 5/2001 |
| WO | WO-88/00606 A1 | 1/1988 |

OTHER PUBLICATIONS

Korean Office Action for Application No. 10-2007-7023929 dated Jun. 28, 2012 (with English translation).

* cited by examiner

*Primary Examiner* — Geraldina Visconti
(74) *Attorney, Agent, or Firm* — Birch, Stewart, Kolasch & Birch, LLP (57) ABSTRACT

A birefringent film which comprises a compound having a proton-accepting group and a compound having a proton-donating group; and a birefringent film which comprises a compound having a proton-accepting group and a proton-donating group. The proton-accepting group and proton-donating group are combined with each other through intermolecular hydrogen bonding.

15 Claims, 2 Drawing Sheets

FIG. 5

FILMS AND PROCESSES FOR PRODUCING THE SAME

TECHNICAL FIELD

The present invention relates to a film suitable as optical compensation films, etc. which are used for flat panel display devices (FPD) such as liquid crystal display devices (LCD) and organic electroluminescence devices (organic EL), and a process for producing the film.

BACKGROUND ART

The flat panel display devices (FPD) such as liquid crystal display devices (LCD) and organic electroluminescence devices (organic EL) which require less space and are less in power consumption as compared with CRT have spread widely as image planes of computers, televisions, portable telephones, car navigation, and portable information terminals. Various optical compensation films are used in FPD for inhibition of reflection, enlargement of visual field angle, etc. For example, mention may be made of reflection inhibiting films such as anti-reflection (AR) films which comprise a multilayered optical thin films differing in refractive index to reduce the surface reflectance due to the light interference effect; polarizing films which transmit only the light of a specific vibration direction and cut-off the other lights; phase difference films which perform optical color compensation of interference colors of LCD such as STN type, TN type or the like; elliptical polarizing films comprising a polarizing film and a phase difference film which are made monolithic; visual field angle enlarging films which enlarge the visual field angle of LCD; etc.

Films having birefringence are used as these optical compensation films, and, specifically, there are used films having birefringence given by stretching polyvinyl alcohol or polycarbonate norbornene resin.

Furthermore, it is known to produce a film having birefringence by forming a film on an alignment layer from a solution containing a discotic liquid crystal compound having a site showing discotic liquid crystal phase, a site giving a hydrogen bond in the molecule and a polymerizable group, thereby to form a non-oriented layer, and then heat treating the layer for 30 seconds by a metallic roll heated to 120° C. to cause polymerization through carbon-carbon bond and orientation of the film (JP-A-2001-139950 (Example 1)).

However, there are problems that the direction of optical axis such as retardation phase axis deviates by stretching, the stretch ratio is restricted for some materials of the film, and it is difficult to optionally design the wavelength dispersion characteristics which are a kind of optical characteristics.

Moreover, according to the method of JP-A-2001-139950, since orientation must also be controlled simultaneously with polymerization, it is not necessarily easy to produce films having birefringence, and the patent publication does not disclose a method for producing films having birefringence without carrying out polymerization or a method for designing the wavelength dispersion characteristics.

DISCLOSURE OF INVENTION

The object of the present invention is to provide a birefringent film which can be simply produced without carrying out stretching and polymerization, and a process for producing the same.

That is, the present invention provides the following [1]-[15].

[1] A birefringent film which comprises:
a first compound having a proton-accepting group and a first structure giving anisotropy in refractive index; and
a second compound having a proton-donating group and a second structure giving anisotropy in refractive index,
wherein said proton-accepting group of the first compound and said proton-donating group of the second compound are intermolecularly associated.

[2] The film described in [1], wherein the first compound has from one to six proton-accepting groups.

[3] The film described in [1] or [2], wherein the second compound has from one to six proton-donating groups.

[4] A birefringent film which comprises:
a third compound having a proton-accepting group, a proton-donating group, and a third structure giving anisotropy in refractive index,
wherein said proton-accepting group of the third compound and said proton-donating group of the third compound are intermolecularly associated.

[5] The film described in [4], wherein the third compound has from one to six proton-accepting groups or from one to six proton-donating groups.

[6] The film described in any one of [1]-[5], wherein the ratio (HA/HD) of the total number (HA) of the proton-accepting groups to the total number (HD) of the proton-donating groups is from 1 to 1.8.

[7] The film described in any one of [1]-[6] which has a reverse wavelength dispersion characteristic.

[8] The film described in any one of [1]-[7] which has a liquid crystal phase.

[9] The film described in any one of [1]-[8], wherein the proton-accepting group is at least one group selected from the group consisting of tertiary amino group, carbonyl group and 5-membered or 6-membered heterocyclic ring containing one or two nitrogen atoms (the heterocyclic ring can be substituted with an alkyl group of 1 to 12 carbon atoms, an alkenyl group of 1 to 12 carbon atoms, an alkynyl group of 1 to 12 carbon atoms or a 5-membered or 6-membered ring and can be condensed with other ring).

[10] The film described in any one of [1]-[9], wherein the proton-donating group is at least one group selected from the group consisting of hydroxyl group, thiol group, primary amino group (—$NH_2$), secondary amino group (—NH—) and carboxyl group.

[11] The film described in any one of [1]-[10], wherein the first structure, the second structure or the third structure is a rod-like structure or a disc-like structure.

[12] The film described in any one of [1]-[11] which is an optical compensation film.

[13] A laminate comprising an alignment layer and the film described in any one of [1]-[12] which covers the alignment layer.

[14] A flat panel display device comprising the film described in any one of [1]-[12].

[15] A process for producing a birefringent film which comprises the steps of:
preparing a solution containing: a first compound having a proton-accepting group and a first structure giving anisotropy in refractive index; and a second compound having a proton-donating group and a second structure giving anisotropy in refractive index; and
forming a film on an alignment layer from the solution.

[16] A process for producing a birefringent film which comprises the steps of:
preparing a solution containing a third compound having a proton-accepting group, a proton-donating group, and a third structure giving anisotropy in refractive index; and
forming a film on an alignment layer from the solution.

[17] A film which comprises a compound having at least one of proton-accepting group and a proton-donating group, and a structure giving anisotropy in refractive index, wherein the compound is intermolecularly associated and the film has birefringence.

The film of the present invention having excellent optical characteristics such as birefringence and liquid crystallinity can be simply produced only by carrying out film formation on an alignment layer without stretching or polymerization.

Furthermore, the process of the present invention can give reverse wavelength dispersion characteristics to a film and can simply adjust the wavelength characteristics by adjusting the thickness of the film.

EMBODIMENTS FOR CARRYING OUT THE INVENTION

The present invention will be explained in detail below.

One embodiment of the film of the present invention is characterized in that the compounds having a structure giving anisotropy in refractive index and a proton-accepting group and/or a proton-donating group are intermolecularly associated with each other and the film has birefringence.

The compound having a structure giving anisotropy in refractive index and a proton-accepting group and/or a proton-donating group means a compound having a structure giving anisotropy in refractive index and a proton-accepting group, a compound having a structure giving anisotropy in refractive index and a proton-donating group, and a compound having a structure giving anisotropy in refractive index, a proton-accepting group and a proton-donating group.

The compound having a structure giving anisotropy in refractive index and a proton-accepting group in the molecule may be a compound in which from one to six, preferably from two to six, proton-accepting groups are combined with the structure giving anisotropy in refractive index.

Here, the proton-accepting group is a tertiary amino group (=N), a carbonyl group or a 5-membered or 6-membered heterocyclic ring containing nitrogen atom.

The 5-membered or 6-membered heterocyclic ring containing nitrogen atom is preferably a 5-membered or 6-membered aromatic heterocyclic ring containing 1 to 2 nitrogen atoms. As the 5-membered or 6-membered heterocyclic ring containing nitrogen atom, mention may be made of, for example, pyridine ring, pyrimidine ring, pyridazine ring, pyrazine ring, pyrrole ring, pyrazole ring, azacyclopentane ring, azacyclohexane ring, diazacyclopentane ring, and diazacyclohexane ring.

Furthermore, an alkyl group of 1 to 12 carbon atoms, an alkenyl group of 1 to 12 carbon atoms, an alkynyl group of 1 to 12 carbon atoms, or a 5-membered or 6-membered ring such as a 5-membered or 6-membered aromatic ring, may be bonded to the 5-membered or 6-membered heterocyclic ring containing nitrogen atom.

The 5-membered or 6-membered heterocyclic ring containing nitrogen atom may condense with a 5-membered or 6-membered aromatic carbon ring or a 5-membered or 6-membered aromatic heterocyclic ring, and specifically may condense with, for example, imidazole ring, quinoline ring or isoquinoline ring.

Suitable examples of the 5-membered or 6-membered heterocyclic ring containing nitrogen atom are those which are represented by the following formulas.

[Formula 1]

(in the above formulas, R represents an alkyl group, alkenyl group or alkynyl group of about 1 to 12 carbon atoms, or a 6-membered carbon ring such as phenyl group).

As the proton-accepting group, carbonyl group and 5-membered or 6-membered heterocyclic ring containing nitrogen atom are suitable since they form strongly a hydrogen bond.

The proton-accepting group preferably combines with a structure which gives anisotropy in refractive index. The proton-accepting group may further combine with other proton-accepting group, a hydrogen atom, an alkyl group of about 1 to 12 carbon atoms such as methyl group, a phenyl group, a proton-donating group referred to hereinafter, or the like.

Furthermore, the proton-accepting group may combine with the structure giving anisotropy in refractive index through a linkage group. The linkage group includes, for example, a hydrocarbon group such as alkylene group of about 1 to 24 carbon atoms and a divalent carbon ring such as phenylene group. The carbon atom of the hydrocarbon group or the carbon ring may be substituted with oxygen atom, sulfur atom, or the like.

The structure giving anisotropy in refractive index is also called mesogen group, and is specifically a rod-like structure, disc-like structure or the like. The rod-like structure is a structure which usually has at least two principal portions comprising at least one member selected from the group consisting of benzene ring, hetero-6-membered ring and trans-substituted cyclohexane ring in the rod-like structure, and the principal portions in the rod-like structure are combined through direct bond or the following linkage groups.

[Formula 2]

Examples of the rod-like structures are structures deriving from mesogen groups such as structures deriving from azomethine, structures deriving from azoxy, structures deriving from cyanobiphenyl, structures deriving from cyanophenyl esters, structures deriving from cyclohexanecarboxylic acid phenyl esters, structures deriving from cyanophenylcyclohexane, structures deriving from phenyldioxane, and structures deriving from tolan.

The compounds having the rod-like structure and the proton-accepting group include, for example, 4,4'-dipyridyl, 1,2-di(4-pyridyl)ethylene, and compounds represented by the following formula.

[Formula 3]

[R' represents a divalent hydrocarbon group of 1 to 12 carbon atoms, —O—(CH$_2$CH$_2$O)$_q$—CH$_2$— (q represents from 0 to 12),

[Formula 4]

The disc-like structure is a structure which is different from the rod-like structure and gives a laminate of the disc-like structures after association, and includes, for example, the structures represented by the following formulas.

[Formula 5]

The disc-like structure may be such a structure that a part of carbon atoms constituting the structure are substituted with nitrogen atoms, oxygen atoms or the like and the structure giving anisotropy in refractive index contains a proton-accepting group and/or a proton-donating group. Examples of the compound having the disc-like structure and the proton-accepting group are α,ω-bis(4-pyridyl)alkanes such as 1,2-bis(4-pyridyl)ethane.

The compounds having a structure giving anisotropy in refractive index and a proton-donating group in the molecule which are used in the present invention are those in which usually from one to six, preferably from two to six, proton-donating groups are combined with the structure giving anisotropy in refractive index.

The proton-donating groups here include, for example, groups having a proton capable of hydrogen bonding, such as hydroxyl group, thiol group, primary amino group (—NH$_2$), secondary amino group (—NH—) and carboxyl group. As the proton-donating groups, hydroxyl group and secondary amino group are preferred because they strongly form an intermolecular hydrogen bond.

The "structure giving anisotropy in refractive index" contained in the compound having a structure giving anisotropy in refractive index and a proton-donating group in the molecule is the same as the "structure giving anisotropy in refractive index" contained in the above compound having a proton-accepting group.

The compounds having a structure giving anisotropy in refractive index and a proton-donating group in which the structure giving anisotropy in refractive index is a disc-like structure include, for example, compounds represented by the following formula.

[Formula 6]

(n is about 0 to 6, preferably about 1 to 4).

Examples of the compounds having a structure giving anisotropy in refractive index, a proton-accepting group and a proton-donating group in the molecule are compounds having, for example, carboxyl group (—COOH), amide group (—CO—NH—), isocyanate group (—N=C=O), urea structure (—N(H)—C(=O)—N(H)—), and structures as shown below.

The carboxyl group (—COOH) has a proton-donating hydroxyl group (—OH) and a proton-accepting carbonyl group (=C=O). The amide group (—CO—NH—), isocyanate group (—N=C=O) and urea structure (—N(H)—C(=O)—N(H)—) have a proton-donating primary amino group (—NH—) and a proton-accepting carbonyl group (=C=O).

The groups having a proton-accepting group and a proton-donating group in one group include, for example, those which are shown below.

[Formula 7]

The film of the present invention may comprise compounds having the three elements of a structure giving anisotropy in refractive index, a proton-accepting group and a proton-donating group in the molecule, these compounds being intermolecularly associated, and in the case of the compound having the three elements, the compound may be used singly to prepare the film.

The compounds having the three elements in the molecule include, for example, those which are represented by the following formulas.

[Formula 8]

[Formula 9]

If the compound used in the present invention has in the molecule a polymerizable group such as (meth)acryloyl group, epoxy group, isocyanate group or vinyl group, the compound is polymerized to change the structure, which sometimes hinder the association through intermolecular hydrogen bonding, and hence the compound preferably has no polymerizable group in the molecule.

One embodiment of the present invention is a film comprising compounds having in the molecule a structure giving anisotropy in refractive index, and a proton-accepting group and/or a proton-donating group, which are intermolecularly associated, and the film is characterized by having birefringence. Preferred is a film which comprises a compound having in the molecule a structure giving anisotropy in refractive index and a proton-accepting group and a compound having in the molecule a structure giving anisotropy in refractive index and a proton-donating group, said compounds being intermolecularly associated, and which has birefringence, or a film which comprises compounds having in the molecule a structure giving anisotropy in refractive index, a proton-accepting group and a proton-donating group, these being intermolecularly associated, and which has birefringence. Especially preferred is a film which comprises a compound having in the molecule a structure giving anisotropy in refractive index and a proton-accepting group and a compound having in the molecule a structure giving anisotropy in refractive index and a proton-donating group, said compounds being intermolecularly associated, and which has birefringence because these compounds can be easily prepared. Further preferred is a film which comprises one kind of a compound having in the molecule a structure giving anisotropy in refractive index and a proton-accepting group and one kind of a compound having in the molecule a structure giving anisot- ropy in refractive index and a proton-donating group, said compounds being intermolecularly associated.

In the film of the present invention, the above compounds are intermolecularly associated with each other. The association usually means bonding through intermolecular hydrogen bond. Being different from the intramolecular hydrogen bond, the intermolecular hydrogen bond here means a hydrogen bond which splits into two or more molecules if the hydrogen bond which participates in association is cut. One or a plurality of the intermolecular hydrogen bonds may be formed. At molecular level, one or more intermolecular hydrogen bonds are formed between one compound molecule and another compound molecule, and further one or more intermolecular hydrogen bonds may be formed between the above one compound molecule and further another compound molecule. As an intermolecular hydrogen bond, for example, there is a case where four intermolecular hydrogen bonds are formed as shown in the following formulas.

For producing the film of the present invention, there is, for example, a process of preparing a solution containing the above compounds and forming the solution into a film on an alignment layer. In the film formation, association by intermolecular hydrogen bonding occurs by removing the solvent in the solution. Since the film is formed on the alignment layer, the resulting film orients to have birefringence. As specific processes for producing the film, there are, for example, a process of casting a solution containing the above compounds on an alignment layer and then removing the solvent to form a film, a process of removing (most of) the solvent from a solution containing the above compounds to produce an associated compound and then forming the associated compound into a film by melting, extrusion or the like on an alignment layer. Furthermore, the film of the present invention may be in the form of a multilayer comprising different kinds of associated compounds.

[Formula 10]

[Formula 11]

As the intramolecular hydrogen bond, for example, there is a case where a hydrogen atom of proton-donating group forms a 6-membered ring structure with proton-accepting group as shown in the following formula.

[Formula 12]

In one embodiment of the present invention, it is preferred for the formation of film by intermolecular hydrogen bond that the ratio (HA/HD) of the total number (HD) of the proton-donating groups contained in the compound constituting the film to the total number (HA) of the proton-accepting groups contained in the compound constituting the film is usually about from 1 to 1.8, preferably about from 1.1 to 1.6.

As the alignment layer here, mention may be made of, for example, those which are obtained by forming into a film a polyimide prepared by imidation of soluble polyimide or polyamic acid by firing at 100-200° C., an alkyl chain-modified polyvinyl alcohol, gelatin or the like, and subjecting the resulting film to rubbing treatment with a fabric such as nylon, those which are obtained by subjecting photosensitive polyimide to polarizing UV treatment, and the like.

Moreover, commercially available alignment layers may be used as they are. The commercially available alignment layers include, for example, SUNEVER (trademark, manufactured by Nissan Chemical Industries) and OPTOMER (trademark, manufactured by JSR Co., Ltd.). Furthermore, there can also be used films obtained by rubbing a film obtained by coating with a solution of the commercially available SUNEVER (trademark), films obtained by rubbing POVAL (trademark, manufactured by Kuraray Co., Ltd.) prepared from modified polyvinyl alcohol.

The solvents used for dissolving the above compounds include, for example, alcohols such as methanol and isopropyl alcohol; ethers such as ethylene glycol dimethyl ether, propylene glycol dimethyl ether and tetrahydrofuran; esters such as γ-butyrolactone, ethyl acetate, butyl acetate, ethylene glycol diacetate and propylene glycol diacetate; ketones such as acetone, methyl ethyl ketone and methyl isobutyl ketone; aromatic hydrocarbons such as toluene and xylene; N-methyl-2-pyrrolidone, pyridine, N,N-dimethylformamide, etc. These solvents may be used each alone or in admixture of two or more.

The solvent may be used in an amount enough to dissolve the compound, and specifically the amount is adjusted so that the concentration of the compound is about 1 to 50% by weight.

The viscosity of the solution is preferably such as sufficient to form intermolecular hydrogen bond and give smooth surface, and is usually about 10 mPa·s or less, preferably about 0.1 to 5 mPa·s.

The solvent is removed, for example, by natural drying, air drying, vacuum drying, or the like.

The film formation can be carried out, for example, by forming a film from the associated compound obtained by removing the solvent. The methods of film formation include, for example, extrusion coating method, direct gravure coating method, reverse gravure coating method, CAP coating method, and die coating method. Furthermore, the film formation may be performed by coating the solution using a coater such as dip coater, bar coater or spin coater and then removing the solvent.

The thus obtained film has birefringence. As birefringence, mention may be made of, for example, tilt angle and retardation value (phase difference value).

Figure 5:
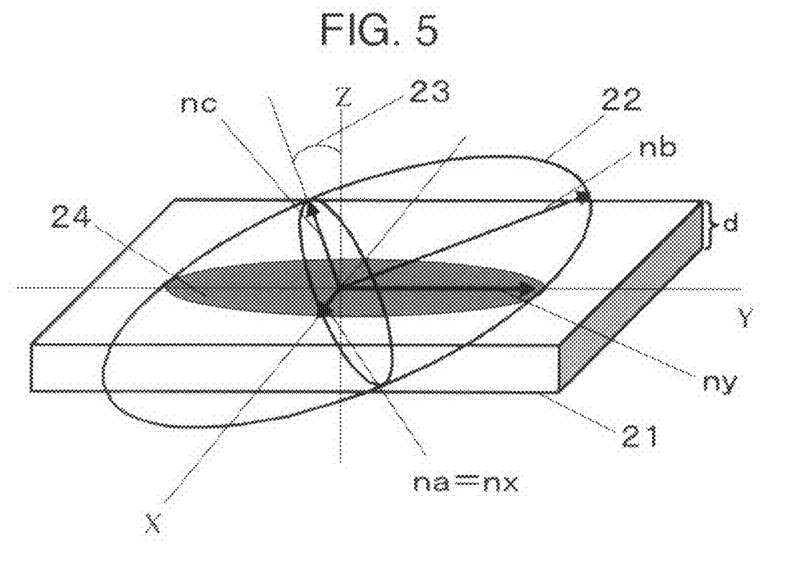
FIG. 5 This is a schematic view of an index ellipsoid in the film according to one embodiment of the present invention.

The birefringence will be explained referring to FIG. 5. Three-dimensional main refractive indexes na, nb, nc are defined in index ellipsoid 22 which shows optical characteristics of film 21 of the present invention. The angle 23 formed by z-axis and main refractive index nc is defined as tilt angle, and major axis ny and minor axis nx of vertical elliptic face 24 formed on the film when viewed from the direction Z are defined, and the product of difference between ny and nx and film thickness d ((ny−nx)·d) is defined as retardation value.

As a method for measuring the retardation value, there is, for example, a method of measurement using ellipsometer. As a method for measuring tilt angle, there may be employed, for example, a method of measuring independence of light on incidence angle in the measurement of the retardation value and calculating the tilt angle from curve fitting using a calculated value of variation of the retardation value of ideal index ellipsoid due to the dependence on incidence angle.

The retardation value is usually about 5 to 700 nm, preferably about 50 to 400 nm.

The film of the present invention usually has liquid crystallinity, and specifically it is preferably thermotropic liquid crystal. The thermotropic liquid crystal is a substance which is liquid crystal in a certain range of temperature. The thermotropic liquid crystal is usually solid crystal at low temperatures and is liquid at high temperatures. Most of the liquid crystals used for liquid crystal panels are thermotropic liquid crystals. The thermotropic liquid crystals include nematic liquid crystals, smectic liquid crystals and cholesteric liquid crystals due to difference in molecular arrangement. Most of the liquid crystal displays which are put to practical use at present use nematic liquid crystals. The nematic liquid crystals are those which have the property that the molecules align in approximately a specific direction.

When the associated compound in which compounds having a structure giving anisotropy in refractive index and a proton-accepting group and/or a proton-donating group are intermolecularly associated with each other is molten on an alignment layer, the associated compound usually becomes isotropic, and when it is successively cooled, it sometimes shows nematic phase. The film obtained by cooling the associated compound in isotropic state to form nematic phase gives reverse wavelength dispersion characteristics.

The retardation value of a film having reverse wavelength dispersion characteristics can be optionally set by changing thickness of the film (hereinafter sometimes referred to as "film thickness"). That is, when anisotropy in refractive index of the film is indicated by Δn and the film thickness is indicated by d, the retardation value Ro is expressed by Ro=d·Δn, and hence Ro can be adjusted by adjusting the film thickness d.

The films of the present invention can be used as optical compensation films, and furthermore as anti-reflection films, phase difference films and visual field angle enlarging films.

Furthermore, the films of the present invention can also be used as components of flat panel display devices (FDP). In this case, the films of the present invention are preferably used in combination with films having other optical characteristics. Specifically, there are an elliptical polarizing film comprising a polarizing film and the optical compensation film of the present invention laminated on the polarizing film, a wideband circularly polarizing plate comprising said elliptical polarizing film on which a wideband λ/4 plate is further laminated, etc.

The film having birefringence of the present invention can be suitably used as a component of flat panel display devices such as liquid crystal display devices (LCD) and organic EL. Specifically, the liquid crystal display device has two transparent substrates on which electrodes and alignment layers are formed, and a liquid crystal sandwiched between the transparent substrates. A voltage is applied to a pair of the electrodes to actuate the liquid crystal molecules to give a light shutter effect. It is preferred that a polarizing film or a polarizing plate is laminated on the transparent substrates. According to one embodiment of the present invention, the above polarizing film or polarizing plate in the liquid crystal display device contains the film of the present invention.

A display device, for example, organic EL device, comprises transparent substrates, a first electrode and a second electrode which are coated on the transparent substrates, at least one light emission layer disposed between the first electrode and the second electrode, and a polarizing plate coated on the transparent substrate on the side opposite to the first electrode, preferably a wideband circularly polarizing plate. In one embodiment of the present invention, a polarizing plate, preferably a wideband circularly polarizing plate, contains the film of the present invention. The second electrode may comprise, for example, gold, silver, aluminum, platinum or an ally thereof. The light emission layer contains, for example, an electrically conductive organic compound.

EXAMPLE

The present invention will be explained in more detail by the following examples, which should not be construed as limiting the invention in any manner.

Preparation Example 1 of Tribenzoic Acid Derivative 2-(2-Chloroethoxy)ethanol (1, 0.18 mol), ethyl 4-hydroxybenzoate (2, 0.12 mol) and potassium carbonate (0.24 mol) were stirred in N,N-dimethylformamide (DMF) at 120° C. for 10 hours to obtain ethyl 4-(2-(2-hydroxyethoxy)-ethoxy)benzoate 3, followed by tosylation according to usual process to obtain a compound 4 in a yield of 56%.

Then, the compound 4 (36.7 mmol), 2,5-hydroxybenzoic acid (18.4 mmol) and cesium carbonate (55.1 mmol) were stirred in DMF at 25° C. for 2 days to obtain a compound 5, and finally the compound 5 was alkali hydrolyzed to obtain a tribenzoic acid derivative 6 which was a compound containing OH groups as the proton-donating groups and benzene rings as the disc-like structures (in a yield of 61% from the compound 4). The product had a melting point of 203° C. The tribenzoic acid derivative 6 was a compound containing three OH groups as the proton-donating groups in the molecule and having benzene rings as the structures having anisotropy in refractive index.

$^1$H NMR of the tribenzoic acid derivative 6 (DMSO-d$_6$, 27° C., ppm) δ 7.86 (d, 4ArH, H-5), 7.16 (s, 1ArH, H-1), 7.05 (m, 2ArH, H-2, H-3), 7.01 (d, 4ArH, H-4), 4.19-4.06 (m, 8H, —CH$_2$CH$_2$OAr), 3.85-3.77 (m, 8H, —CH$_2$CH$_2$OAr)

$^{13}$C NMR of the tribenzoic acid derivative 6 (DMSO-d$_6$, 27° C., ppm) δ 167.2 (—COOH), 162.1, 131.4, 123.1, 114.3 (ArC, —C$_6$H$_4$COOH), 152.3, 147.7, 123.6, 123.3, 114.4, 112.8 (ArC, 4-position and 5-position of benzene ring), 69.0 (—OCH$_2$CH$_2$OCH$_2$CH$_2$O—), 68.5, 68.3, 67.5 (—OCH$_2$CH$_2$OAr)

Preparation Example 2 of Tribenzoic Acid Derivative

A tribenzoic acid derivative 7 was prepared in the same manner as in Preparation Example 1, except that 3,4-hydroxybenzoic acid was used in place of 2,5-hydroxybenzoic acid. The yield of the tribenzoic acid derivative 7 from the compound 4 was 61%. The compound 7 had a melting point of 203° C.

$^1$H NMR of the tribenzoic acid derivative 7 (DMSO-d$_6$, 27° C., ppm) δ 7.85 (d, 4ArH, H-4, J=8.4 Hz), 7.53 (d. 1ArH, H-1, J=8.5 Hz), 7.47 (s, 1ArH, H-3), 7.06 (d, 1ArH, H-2, J=8.5 Hz), 6.97 (D, 4ArH, H-5, J=8.4 Hz), 4.14 (m, 8H, —CH$_2$CH$_2$OAr), 3.82 (m, 8H, —CH$_2$CH$_2$OCH$_2$CH$_2$—)

$^{13}$C NMR of the tribenzoic acid derivative 7 (DMSO-d$_6$, 27° C., ppm) δ 167.2 (—COOH), 162.1, 131.4, 123.1, 114.3 (ArC, —C$_6$H$_4$COOH), 152.3, 147.7, 123.6, 123.3, 114.4, 112.8 (ArC, 4-position and 5-position of benzene ring), 69.0 (—OCH$_2$CH$_2$OCH$_2$CH$_2$O—), 68.5, 68.3, 67.5 (—OCH$_2$CH$_2$OAr)

[Formula 13]

[Preparation Example 1]

[Preparation Example 2]

Preparation Example 1 of Film

The above tribenzoic acid derivative 6 and 1,2-bis(4-pyridyl)ethylene (having a melting point of 152° C., manufactured by Aldrich Co., Ltd.) at a molar ratio of 2:3 (1.33 as HA/HD) were dissolved in pyridine to prepare a solution containing 90% by weight of pyridine. The solution was subjected to vacuum drying to distill off most of the pyridine to obtain an associated compound comprising a tribenzoic acid derivative and bispyridylethylene.

Separately, polyimide SE-610 (manufactured by Nissan Chemical Industries, Ltd.) was coated on a glass substrate by spin coating to form a film. The resulting polyimide film was subjected to rubbing treatment to form an alignment layer.

The above associated compound was put on the alignment layer and heated to 186° C. to melt and cast the associated compound, followed by cooling to room temperature to obtain a transparent film.

The resulting film was interposed in the state of cross-nicol between a pair of polarizing plates (SUMIKARAN SR1862A, trademark, manufactured by Sumitomo Chemical Co., Ltd.), and when the film was rotated, there was an axis which cut off the transmitted light. Thus, it was confirmed that the film had birefringence.

Furthermore, the associated compound was put on an alignment layer and heated while observing it under a polarizing microscope. It began to transit to a nematic phase at 180° C. and became completely isotropic at 200° C. When successively cooled, it was confirmed that it showed a nematic phase at 195° C. and a monodomain was formed by intermolecular hydrogen bonding.

Liquid crystal phase could not be observed when 1,2-bis (4-pyridyl)ethylene and tribenzoic acid derivative were used each alone.

Measurement Example 1 of Reverse Wavelength Dispersion Characteristics

Figure 1:
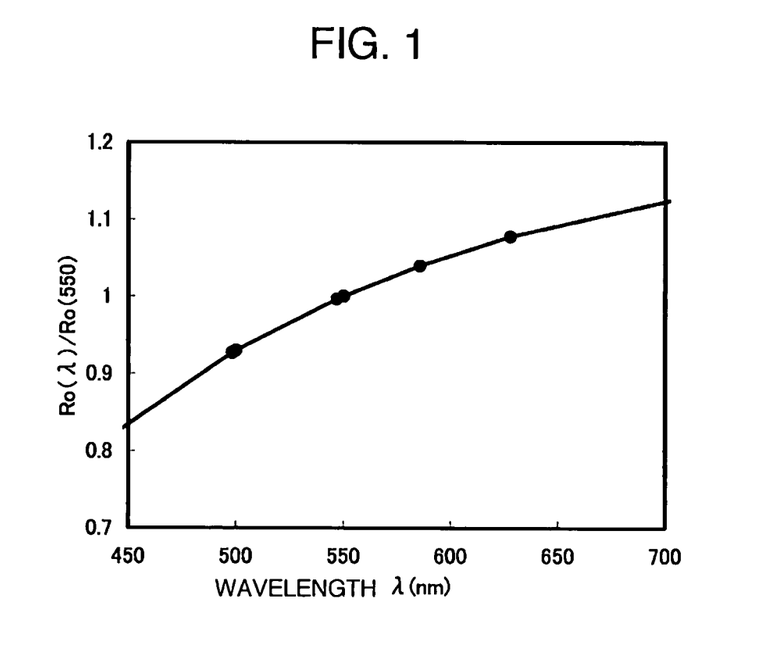
FIG. 1 This is a graph which shows wavelength dispersion characteristics of the film obtained in Preparation Example 1 of film. The ordinate axis indicates the value obtained by dividing the phase difference value by the phase difference value of wavelength 550 nm [Ro(λ)/Ro(550)], and the abscissa axis indicates wavelength (λ).

A retardation value (phase difference value) at wavelength 585.6 nm of the film obtained in the film preparation example 1 in the front direction and wavelength dispersion characteristics in the range of the wavelength of 450-700 nm were measured by a measuring device (COBRA-WR manufactured by Oji Instrument Co., Ltd.). The retardation value in the front direction was 456 nm, and the results of wavelength dispersion characteristics are shown in FIG. 1. A ratio [Ro(450)/Ro(550)] of the retardation value Ro(450) at a measurement wavelength of 450 nm to the retardation value Ro(550) measured at a measurement wavelength of 550 nm was 0.77, and a ratio [Ro(650)/Ro(550)] of the retardation value Ro(650) at a measurement wavelength of 650 nm to the phase difference value Ro(550) measured at a measurement wavelength of 550 nm was 1.12, which indicated a reverse wavelength dispersion characteristic.

Preparation Example 2 of Film

A transparent film was obtained in the same manner as in Preparation Example 2 of film, except that the tribenzoic acid derivative 7 was used in place of the tribenzoic acid derivative 6. It was confirmed in the same manner as in Preparation Example 2 that the resulting film had birefringence.

Furthermore, the associated compound was put on an alignment layer and heated while observing it under a polarizing microscope. It began to melt at 170° C. and completely melted at 186° C. When the associated compound was successively cooled, it was confirmed that it showed a nematic phase at 165-135° C. and a monodomain was formed by intermolecular hydrogen bonding. Liquid crystal phase could not be observed when the tribenzoic acid derivative 7 was used alone.

Measurement Example 2 of Reverse Wavelength Dispersion Characteristics

Figure 2:
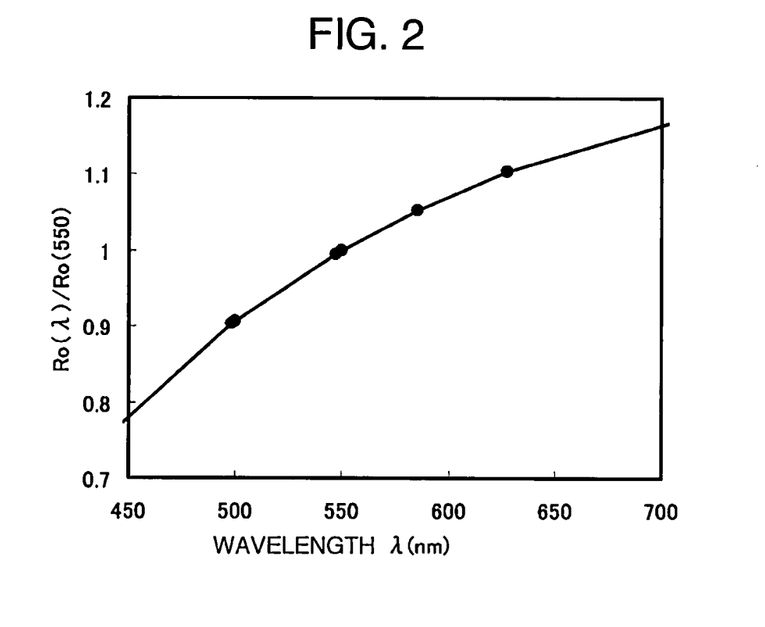
FIG. 2 This is a graph which shows wavelength dispersion characteristics of the film obtained in Preparation Example 2 of film.

The measurement was carried out in the same manner as in Measurement Example 1 of optical characteristics using the film obtained by Preparation Example 2 of the film. The retardation value in the front direction was 456 nm, and the results of wavelength dispersion characteristics are shown in FIG. 2. A ratio [Ro(450)/Ro(550)] of the retardation value Ro(450) at a measurement wavelength of 450 nm to the retardation value Ro(550) at a measurement wavelength of 550 nm was 0.83, and a ratio [Ro(650)/Ro(550)] of the retardation value Ro(650) at a measurement wavelength of 650 nm to the retardation value Ro(550) at a measurement wavelength of 550 nm was 1.09, which indicated a reverse wavelength dispersion characteristic.

Preparation Examples 3-8 of Film

Bispyridylethylene and the tribenzoic acid derivative 6 were dissolved in dimethylacetamide with changing in the range of 1.13-1.51 the ratio (HA/HD) of the total number (HA) of proton-accepting groups contained in the bispyridylethylene and the total number (HD) of proton-donating groups contained in the tribenzoic acid derivative 6, thereby to prepare a solution containing 77% by weight of dimethylacetamide.

An aqueous polyvinyl alcohol solution was coated on a glass substrate and dried at 120° C. for 60 minutes, followed by subjecting to rubbing treatment to form an alignment layer. The above dimethylacetamide solution was dropped on the film and coated by spin coating method and dried at 50° C. for 5 minutes to form a colorless, transparent film. The resulting film was interposed in the state of cross-nicol between polarizing plates (SUMIKARAN SR1862A, trademark, manufactured by Sumitomo Chemical Co., Ltd.), and when the film was rotated, there was an axis which cut off the transmitted light in the film. Thus, it was confirmed that the film had birefringence. It was also confirmed by a polarizing microscope that all the resulting films were monodomain-oriented.

The phase difference value (retardation Ro) and tilt angle of the above films were measured by KOBRA-WR (manufactured by Oji Instrument Co., Ltd.), and the results are shown in Table 1 together with HA/HD.

A solution having the same composition as giving the above films was dried and crystallized on a slide glass. Then, the crystallized solution was once heated to the melting point, and the temperature at which the crystallized solution transited from isotropic state to nematic phase (hereinafter sometimes referred to as "N-I point") is shown in Table 1 together with HA/HD.

TABLE 1

| | Preparation Example | | | | | |
| --- | --- | --- | --- | --- | --- | --- |
| | 3 | 4 | 5 | 6 | 7 | 8 |
| HA/HD | 1.13 | 1.2 | 1.29 | 1.33 | 1.39 | 1.51 |
| Ro (nm) | 108 | 113 | 110 | 108 | 109 | 108 |
| Tilt angle | 0.4 | 0.7 | 0.7 | 1.4 | 0.4 | 0.7 |
| N-I point | 194° C. | 193° C. | 210° C. | 171° C. | 210° C. | 194° C. |

Preparation Example of Liquid Crystal Display Device

Figure 3:
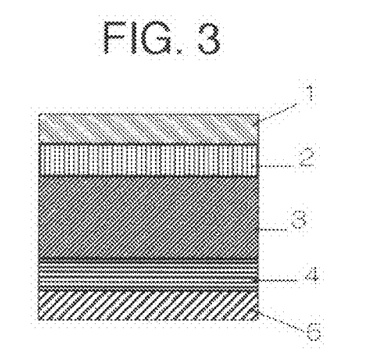
FIG. 3 This is a schematic sectional view of the liquid crystal display device according to one embodiment of the present invention.

The half in area of upper and lower polarizing plates of a 17-inch liquid crystal television (LT17N23WB) manufactured by SAMSUNG Co., Ltd. were peeled off, and elliptical polarizing plates of the resulting A-plate and C-plate were laminated with each other as shown in FIG. 3.

The liquid crystal display device had a liquid crystal panel 3 having first and second surfaces which were substantially parallel to each other, an A-plate 2 fixed on the first surface with an adhesive, a polarizing film 1 fixed with an adhesive on the surface of the A-plate 2 opposite to the first surface, a C-plate 4 fixed on the second surface with an adhesive, and a polarizing film 5 fixed with an adhesive on the surface of the C-plate 4 opposite to the second surface. The film obtained in Preparation Example 1 or 2 was used as the polarizing film 1 and the polarizing film 5. The visual field angle characteristics of the above-mentioned liquid crystal television on the market were compared with those of the liquid crystal display device prepared in this Example to obtain the similar results of wide visual field angle characteristics.

Preparation Example of Organic Electroluminescence (Organic EL)

Figure 4:
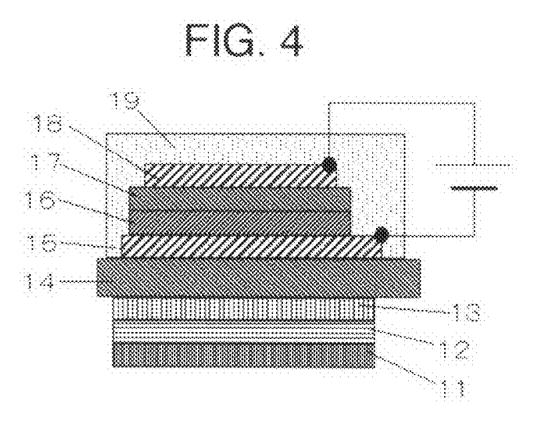
FIG. 4 This is a schematic sectional view of the organic electroluminescence display device according to one embodiment of the present invention.

The organic electroluminescence light emitting element shown in FIG. 4 was prepared in the following manner. First, an indium-tin oxide (ITO) layer was formed on the surface of a glass substrate 14 as an electrode 15 which was a positive electrode. Then, a hole-transporting layer 16 was formed on the surface of the ITO layer. Specifically, the layer was formed by coating a mixture of polyethylenedioxythiophene and sodium polystyrenesulfonate at room temperature by spin coating method. Furthermore, a light emitting layer 17 was formed on the surface of the hole-transporting layer 16. Specifically, the layer was formed by coating a THF solution of a mixture of polyvinylcarbazole and Alq3 at room temperature by spin coating method. Then, an Al/Li (9:1) alloy was vapor deposited on the surface of the light emitting layer 17 to form an electrode 18 as a negative electrode. Sealing with polyimide 19 was carried out to cover the surface of the glass substrate 14, the side face of the positive electrode 15, the side face of the hole transporting layer 16, the side face of the light emitting layer 17 and the surface and side face of the negative electrode 18.

On the other hand, a ¼-wavelength plate 13 was provided with an adhesive on the surface of the glass substrate 11, a ½-wavelength plate 12 was provided with an adhesive on the surface of the ¼-wavelength plate 13, and a polarizing film 11 was provided with an adhesive on the surface of the ½-wavelength plate 12. The wavelength plate means a birefringence element which produces phase difference between S-polarization and P-polarization when light passes therethrough. When the film obtained in Preparation Example 1 or 2 was used as the ¼-wavelength plate 13, it was confirmed that satisfactory black display and green light emission were obtained.

INDUSTRIAL APPLICABILITY

The film of the present invention can be produced by a simple process of removal of solvent and formation of film without the steps of stretching and polymerization. Furthermore, a film having a wavelength characteristic of [Ro(450)/Ro(550)]≦1≦[Ro(650)/Ro(550)], namely, reverse wavelength characteristic, can be obtained by optionally selecting the compounds used and the film thickness. Thus, the film of the present invention can be used singly as a ¼-wavelength plate or a ½-wavelength plate.

Moreover, since the film of the present invention is superior in optical anisotropy, it can be suitably used for flat panel display devices (FPD) such as liquid crystal display device (LCD) and organic electroluminescence (organic EL).

The invention claimed is:

1. A birefringent film which comprises:
a first compound having a proton-accepting group and a first structure giving anisotropy in refractive index; and
a second compound having a proton-donating group and a second structure giving anisotropy in refractive index,
wherein said proton-accepting group of the first compound and said proton-donating group of the second compound are intermolecularly associated to form a monodomain,
wherein the proton-accepting group is at least one group selected from the group consisting of carbonyl group and 6-metribered heterocyclic ring containing one nitrogen atom (the heterocyclic ring can be substituted with an alkyl group of 1 to 12 carbon atoms, an alkenyl group of 1 to 12 carbon atoms, an alkynyl group of 1 to 12 carbon atoms or a 5-membered or 6-membered ring and can he condensed with other ring),
wherein the proton-donating group is a carboxyl group,
wherein the first structure or the second structure is a rod-like structure or a disc-like structure; and
wherein the film contains a liquid crystal phase.

2. A film according to claim 1, wherein the first compound has from one to six proton-accepting groups.

3. A film according to claim 1, wherein the second compound has from one to six proton-donating groups.

4. A birefringent film which comprises:
a compound having a proton-accepting group, a proton-donating group, and a structure giving anisotropy in refractive index,
wherein said proton-accepting group of the compound and said proton-donating group of the compound are intermolecularly associated to form a monodomain,
wherein the proton-accepting group is at least one group selected from the group consisting of carbonyl group and 6-membered heterocyclic ring containing one nitrogen atom (the heterocyclic ring can be substituted with an alkyl group of 1 to 12 carbon atoms, an alkenyl group of 1 to 12 carbon atoms an alkynyl group of 1 to 12 carbon atoms or a 5-membered or 6-membered ring and can be condensed with other ring),
wherein proton-donating group is a carboxyl group,
wherein the structure is a rod-like structure or a disc-life structure; and
wherein the film contains a liquid crystal phase.

5. A film according to claim 4, wherein the compound has from one to six proton-accepting groups or from one to six proton-donating groups.

6. A film according to claim 1, wherein the ratio (HA/HD) of the total number (HA) of the proton-accepting groups to the total number (HD) of the proton-donating groups contained in the compound constituting the film is from 1 to 1.8.

7. A film according to claim 1 which has a reverse wavelength dispersion characteristic.

8. A film according to claim 1 which is an optical compensation film.

9. A laminate comprising an alignment layer and a film according to claim 1 which covers the alignment layer.

10. A flat panel display device comprising a film according to claim 1.

11. A process for producing a birefringent film which comprises the steps of:
preparing a solution containing:
a first compound having a proton-accepting group and a first structure giving anisotropy in refractive index; and
a second compound having a proton-donating group and a second structure giving anisotropy in refractive index;
forming a film on an alignment layer from the solution; and
without the steps of stretching and polymerization.

12. A process for producing a birefringent film which comprises the steps of:
preparing a solution containing a compound having a proton-accepting group, a proton-donating group, and a structure giving anisotropy in refractive index;
forming a film on an alignment layer from the solution; and
without the steps of stretching and polymerization.

13. A film which comprises a compound having at least one of a proton-accepting group and a proton-donating group, and a structure giving anisotropy in refractive index,
wherein the compound is intermolecularly associated to form a monodomain and the film has birefringence,
wherein the proton-accepting group is at least one group selected from the group consisting of carbonyl group and 6-membered heterocyclic ring containing one nitrogen atom (the heterocyclic ring can be substituted with an alkyl group of 1 to 12 carbon atoms, an alkenyl group of 1 to 12 carbon atoms, an alkynyl group of 1 to 12 carbon atoms or a 5-membered or 6-membered ring and can be condensed with other ring),
wherein the proton-donating group is a carboxyl group,
wherein the structure is a rod-like structure or a disc-like structure; and
wherein the film contains a liquid crystal phase.

14. A film according to claim 1, which further comprises a compound having a third structure, and
wherein the first structure or the second structure or the third structure is a rod-like structure or a disc-like structure.

15. A film according to claim 1, which further comprises a compound having a third structure that is a rod-like structure or a disc-like structure.

* * * * *